Sept. 7, 1937. E. W. SPANAGEL 2,092,031
PROCESS OF PREPARING CYCLIC ESTERS
Filed March 12, 1935
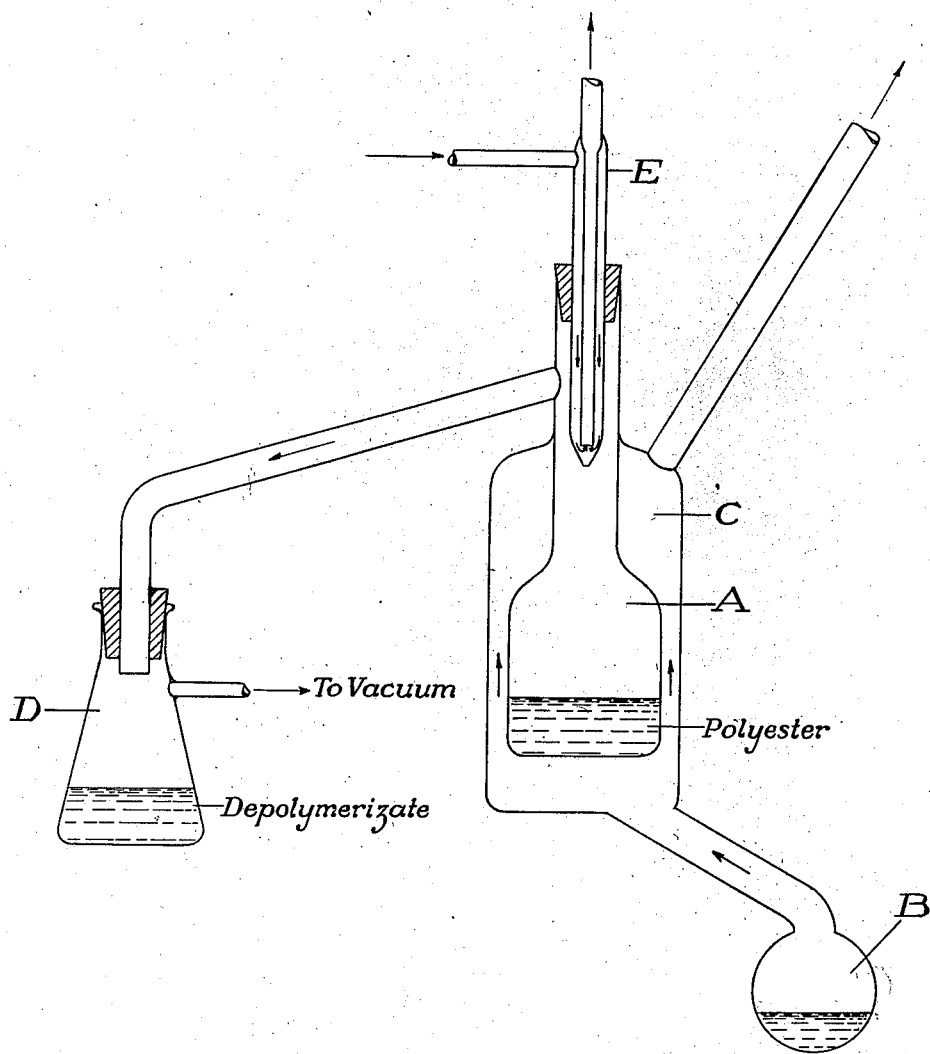
Edgar W. Spanagel INVENTOR.
BY
Paul J Culhane ATTORNEY.

Patented Sept. 7, 1937

2,092,031

UNITED STATES PATENT OFFICE

2,092,031

PROCESS OF PREPARING CYCLIC ESTERS

Edgar W. Spanagel, Wilmington, Del., assignor to E. I. du Pont de Nemours & Company, Wilmington, Del., a corporation of Delaware Application March 12, 1935, Serial No. 10,637

9 Claims. (Cl. 260—123)

This invention relates to cyclic esters, particularly those having rings of more than seven atoms, and processes for making the same. More particularly, it relates to a catalytic process for the preparation of such esters and is, in general, an improvement on that disclosed in copending application Serial No. 657,408, filed February 18, 1933.

It is well known that cyclic esters having rings of five or six atoms are easily obtained by the self-esterification of appropriate open chain compounds (e. g., hydroxybutyric acid, $$HOCH_2CH_2CH_2COOH$$

gives butyro-lactone $$\boxed{-O-CH_2-CH_2-CH_2-CO-}$$

and monomeric ethylene carbonate, $$\boxed{-O-CO-O-CH_2-CH_2-}$$

is readily obtained by the action of diethyl carbonate or of phosgene on ethylene glycol); and it might be supposed that cyclic esters having rings of more than seven atoms would be obtained from appropriate open chain compounds in the same way. But in fact, they cannot be obtained in this way. Extensive study (J. Am. Chem. Soc. 51, 625, 2560, 3450 (1929); 52, 314, 711, 3292 (1930); Helv. Chim. Acta 12, 463 (1929)) has shown the reason for this is that the ester formation proceeds intermolecularly and yields polyesters of high molecular weight.

Thus, hydroxydecanoic acid, $HO(CH_2)_9COOH$, undergoes self-esterification when it is heated; the product, however, is a polyester of the general formula $$HO(CH_2)_9CO-O(CH_2)_9CO-O(CH_2)_9CO-\ldots$$
$$-O(CH_2)_9CO-OH,$$

and no discoverable amount of the corresponding cyclic lactone,

is formed. Similarly, esters derived from dibasic acids and glycols are polymeric unless the nature of the reacting materials is such as to permit the formation of a ring of five or six atoms. For example, ethylene succinate is obtained in the form of a polyester, $$\ldots-O(CH_2)_2OCO(CH_2)_2CO-O(CH_2)_2OCO$$
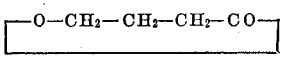
$$(CH_2)_2CO-O(CH_2)_2OCO(CH_2)_2CO-\ldots$$

and not as a monomeric cyclic ester,

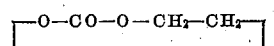

Again, hexamethylene carbonate is obtained as $$\ldots-COO(CH_2)_6O-COO(CH_2)_6O-COO$$
$$(CH_2)_6O-COO(CH_2)_6O-\ldots$$

and not as

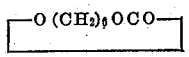

For the purpose of further discussing some of the above compounds it is convenient to introduce and define certain terms. The polymeric esters prepared or derived from hydroxy acids or from dibasic acids and glycols are called linear polyesters. The molecules are long chains having a structure that may be symbolized by the general formula, $$\ldots-ORCO-ORCO-ORCO-ORCO-ORCO-$$
$$ORCO-\ldots$$

(R is not necessarily a hydrocarbon residue. The length of the molecules and the nature of the terminal groups depend upon the nature of the reactants and the condition of the reaction.) The recurring unit (—ORCO—) in this structure is called the structural unit, and the number of atoms in the chain of this unit is called the unit length. Examples of structural units are:

| Name of ester | Formula of structural unit | Unit length |
|---|---|---|
| Ethylene succinate | $-O(CH_2)_2OCO(CH_2)_2CO-$ | 8 |
| Ethylene carbonate | $-O(CH_2)_2OCO-$ | 5 |
| Decamethylene carbonate | $-O(CH_2)_{10}OCO-$ | 13 |
| Self-ester from ω-hydroxy-decanoic acid. | $-O(CH_2)_9CO-$ | 11 |

The unit length is obviously defined by the nature of the compounds from which the ester is derived. It is the same as the number of atoms that would be present in the ring of the monomeric cyclic ester if such an ester could be obtained. In general, this unit length determines the nature of the ester that will be produced. If the unit length is five or six, a cyclic monomeric ester is readily obtained; if the unit length is more than seven, the product is a linear polyester. These generalizations apply to esters derived from hydroxy acids or from dibasic acids plus dihydric alcohols, whether the esters are prepared from these reactants as such or from appropriate derivatives of these reactants.

Linear polyesters are either solids or highly viscous liquids. They are non-volatile and stable and they generally show little or no tendency to break down under the influence of heat until a very high temperature is reached (e. g., 300° C. to 500° C.) and the reaction that then occurs is not simple depolymerization but destructive thermal decomposition: carbonaceous, tarry, gaseous, and liquid products are formed. From the latter it is sometimes possible to isolate very small amounts of cyclic esters (true depolymerization products of the polyester used): dimeric cyclic esters have thus been obtained from ethylene succinate, tetramethylene carbonate, and trimethylene oxalate; but the process is not general; the yields are very poor; and no monomeric cyclic esters having more than seven atoms in the ring have ever been obtained by this method.

This invention has as an object the preparation of cyclic esters having at least seven members in the ring by an improved process. A further object is the provision of a simple and rapid method for the depolymerization of linear polyesters. A still further object is the provision of catalysts whereby this reaction is rendered more feasible and economical. A still further object is the preparation of new and useful odoriferous compounds. Further objects will appear hereinafter.

These objects are accomplished by the following invention, wherein a linear polyester is heated to an elevated temperature, preferably above 150° C., but below the temperature of destructive thermal decomposition in the presence of an inorganic compound of the class consisting of the chlorides, nitrates, carbonates, and oxides of magnesium, manganese, iron, cobalt, and tin (all in the divalent state) under diminished pressure in an apparatus designed for the removal of the volatile products as they are formed.

The method disclosed in the mentioned copending application consists essentially in heating a linear polyester in high vacuum in the presence of a basic catalyst under conditions which permit the removal of the volatile products as they are formed. This method gives satisfactory results with esters derived from carbonic, oxalic, and malonic acids, but less satisfactory results with esters derived from higher acids of the series, such as succinic, glutaric, sebacic, etc., because of the slow rate of depolymerization of the linear polyester. It is likewise less satisfactory for the preparation of cyclic esters from polyesters derived from hydroxy acids.

It has now been found that the chlorides, nitrates, carbonates, and oxides of magnesium, manganese, iron, cobalt, and tin (all in the divalent state) are much more powerful and effective catalysts for the depolymerization of linear polyesters than the basic compounds previously disclosed. The use of these new catalysts renders possible the rapid depolymerization of linear polyesters derived from succinic, glutaric, and higher members of the dicarboxylic acid series and thus makes possible the preparation of many membered cyclic esters, hitherto obtainable only with the greatest of difficulty, in good yields, ranging from 40% to 80%. These catalysts are also useful in the depolymerization of polyesters derived from lower dibasic acids, such as carbonic, oxalic, and malonic acids, and in the depolymerization of polyesters derived from hydroxy acids. In addition to being more effective catalysts than the basic compounds previously disclosed, catalysts of the present invention give a much higher ratio of monomer to dimer, which is desirable since the cyclic monomer has the more pronounced odor and is of greater value as a perfume ingredient.

The invention, therefore, consists in depolymerizing linear polyesters in the presence of a catalyst of the class mentioned. The preparation of the linear polyester is not a part of the present invention, and polyesters prepared by any method may be used. A suitable method for the preparation of linear polyesters from glycols and dibasic acids consists in heating substantially equimolecular quantities of glycol and dibasic acid at 150°–200° C. for several hours and then heating the resultant mass for a few more hours at 200° C. under 2 mm. absolute pressure. Esters of the dibasic acid may also be used in the preparation of the polyesters, and in this case it is sometimes desirable to carry out the reaction in the presence of a small amount of sodium or other ester interchange catalyst. It is desirable to prepare the polyester with a small excess of glycol, since polymers prepared in this way seem to depolymerize more readily. Polyesters can be obtained in much the same way from hydroxy acids. Linear polyesters formed by the above methods may be depolymerized directly without purification. The crude polymers differ in properties, depending upon the reactants from which they were prepared. In general, they are waxy masses with varying degrees of hardness.

The depolymerization of linear polyesters with the formation of many membered cyclic esters is effected by heating the polymer under reduced pressure below 10 mm. and preferably below 1 mm., absolute pressure, in the presence of a small amount of catalyst taken from the class above named. Generally, from 0.1 to 1.0% of catalyst is used, but larger amounts are not harmful. The polyester-catalyst mixture may be prepared by simple admixture or by incorporating the catalyst in the polyester during its preparation. A molecular still may be used for the depolymerization, but with the catalysts herein described ordinary distillation equipment is usually satisfactory. An apparatus which has proven especially useful for this purpose is that illustrated in the accompanying figure.

The polyester and catalyst are placed in A, which is fitted to a dephlegmator E and a receiver D. D is connected with a pump capable of evacuating the system to less than 1 mm. pressure. The content of A is then heated to the depolymerization temperature by the vapors in C, which arise from a suitable liquid vigorously boiled in B. The liquid in B is chosen so that its boiling temperature is sufficiently high to cause depolymerization of the polyester but not high enough to cause destructive thermal decomposition. The difference between depolymerization and thermal decomposition is important as shown above. Temperatures of 150°–375° C. are used, the preferred range being 250°–275° C. When necessary the ratio of monomer to dimer may be greatly increased by the use of reflux made possible by the dephlegmator E, which is cooled by steam or other suitable vapor or liquid. This is highly desirable, inasmuch as the monomeric cyclic esters are the most useful, at least as far as perfume ingredients are concerned. The apparatus described in the figure may be constructed of glass or other suitable material.

This invention has greatly extended the field of synthetic possibilities. A host of cyclic esters can be prepared by depolymerizing polyesters derived from various combinations of dibasic acids and glycols. One hundred monomeric cyclic esters alone may be obtained from a group of ten acids and ten glycols. A large number of polyesters may also be prepared from hydroxy acids. Table I includes a list of new cyclic esters prepared by the method of this invention.

TABLE I

*New cyclic esters*

| Cyclic ester (M=monomer; D=dimer) | Ring size | B. P. ° C./mm. | M. P. ° C. |
|---|---|---|---|
| Ethylene succinate (D) | 16 | | 131 |
| Trimethylene succinate (M) | 9 | 94–100°/2 | 81 |
| Trimethylene succinate (D) | 18 | | 138 |
| Tetramethylene succinate (M) | 10 | 95–96°/2 | Liq. |
| Tetramethylene succinate (D) | 20 | | 121 |
| Pentamethylene succinate (M) | 11 | 88–89°/1 | Liq. |
| Pentamethylene succinate (D) | 22 | | 87 |
| Hexamethylene succinate (M) | 12 | 108–110°/2 | Liq. |
| Hexamethylene succinate (D) | 24 | | 110 |
| Heptamethylene succinate (M) | 13 | 116–118°/1–2 | 49 |
| Heptamethylene succinate (D) | 26 | | 86 |
| Octamethylene succinate (M) | 14 | | 71 |
| Octamethylene succinate (D) | 28 | | 109 |
| Nonamethylene succinate (M) | 15 | | 71 |
| Decamethylene succinate (M) | 16 | 135–140°/2 | 58 |
| Dodecamethylene succinate (M) | 18 | 156–159°/2 | Liq. |
| Tridecamethylene succinate (M) | 19 | 154°/1–2 | Liq. |
| Octadecamethylene succinate (M) | 24 | 199–201°/2 | Liq. |
| Decamethylene glutarate (M) | 17 | 136–139°/2 | Liq. |
| Hexamethylene adipate (M) | 14 | 117°/2 | 70 |
| Triethylene (glycol) adipate (M) | 16 | 162°/2 | 59 |
| Nonamethylene adipate (M) | 17 | 144–146°/2 | Liq. |
| Heptamethylene suberate (M) | 17 | 158–160°/1–2 | 47 |
| Ethylene azelate (M) | 13 | | 52 |
| Ethylene azelate (D) | 26 | | 145 |
| Tetramethylene azelate (M) | 15 | 123–124°/2 | Liq. |
| Hexamethylene azelate (M) | 17 | | 59 |
| Trimethylene sebacate (M) | 15 | 130–133°/2 | Liq. |
| Tetramethylene sebacate (M) | 16 | 136–138°/2 | Liq. |
| Pentamethylene sebacate (M) | 17 | 159–160°/1–2 | 37 |
| Hexamethylene sebacate (M) | 18 | | 47 |
| Diethylene (glycol) sebacate (M) | 17 | 156–157°/2 | Liq. |
| Ethylene decamethylene dicarboxylate (M) | 16 | 139–141°/2 | Liq. |
| Ethylene brassylate (M) | 17 | 139–142°/2 | Liq. |
| Decamethylene octadecanedioate (M) | 30 | | 60 |
| Ethylene phthalate (M) | 8 | 160–170°/2 | 55 |
| Ethylene phthalate (D) | 16 | | 198 |

For the most part the many membered cyclic esters are liquids or low melting solids. The structure of each cyclic ester was established by analysis, molecular weight determination, physical properties, etc. The method of formation is also indicative of the structure. The cyclic esters herein described have much in common with the large ring ketones, anhydrides, and carbonates described in the literature. Many of the cyclic esters have odors which make them of value as perfume ingredients. Perhaps the most valuable compounds for this purpose are those having rings of 15, 16 or 17 members. Typical examples of this group are tetradecamethylene carbonate, nonamethylene adipate, hexamethylene azelate, decamethylene succinate, ethylene brassylate, and ω-hydroxy pentadecanoic acid lactone. These compounds all have musk-like odors which make them valuable substitutes for the essential principle in musk and civet. In general, the intensity of the odor is greatest in the case of the cyclic esters of the lactone type, i. e., those derived from hydroxy acids.

While both monomeric and dimeric cyclic esters are formed when polyesters are depolymerized, the relative amounts of these products vary, depending chiefly upon the experimental conditions and the unit length of the ester. The catalysts of the present invention are more active than those previously described, and favor the formation of monomer. The use of reflux as illustrated in the drawing also increases the ratio of monomer to dimer. The effect of unit length on the ratio of monomer to dimer is shown in Table II, illustrating the results obtained in the depolymerization of a series of polymeric succinates under identical conditions. In each case 50 g. of polymer and 0.5 g. of hydrated stannous chloride were heated without reflux in a vapor heated still to 268° C. at 1 mm. pressure for four hours. It will be noted from the table that the dimer was formed almost exclusively in the case of ethylene succinate in which the monomer would be an 8-membered ring, whereas the 15-membered monomer was almost the sole product in the case of nonamethylene succinate.

TABLE II

*Influence of structure of monomer formation*

| Polymer | Percent crude distillate | Size of monomeric ring | Percent monomer | Percent dimer |
|---|---|---|---|---|
| Ethylene succinate | 73 | 8 | 0 | 100 |
| Trimethylene succinate | 47 | 9 | 11 | 89 |
| Tetramethylene succinate | 48 | 10 | 79 | 21 |
| Pentamethylene succinate | 77 | 11 | 74 | 26 |
| Hexamethylene succinate | 78 | 12 | 80 | 20 |
| Octamethylene succinate | 81 | 14 | 95 | 5 |
| Nonamethylene succinate | 84 | 15 | 100 | 0 |
| Decamethylene succinate | 76 | 16 | 100 | 0 |

Having outlined above the general principles and purposes of the invention, the following exemplifications thereof are added for purposes of illustration but not in limitation.

*Example 1*

Substantially equimolecular portions of hexamethylene glycol and succinic acid were heated in a distillation flask to 200° C. for about three hours. The resultant mass was then heated at 200° C. under two mm. pressure for two hours. The linear polyester thus formed was not purified but was used in the crude state in the following depolymerization experiment:

A mixture of 50 g. of crude hexamethylene succinate polymer and 0.5 g. of hydrated stannous chloride was heated at 263° C. under 1 mm. absolute pressure in an apparatus of the type shown in the figure. The temperature of 268° C. was maintained by the vapors of boiling orthochlorodiphenyl. The polymer soon became soft and bubbled vigorously. In about 10 minutes distillation started, the rates of distillation being as follows:

Drops per minute
After 15 minutes_____ 12
After 30 minutes_____ 14
After 45 minutes_____ 10
After 60 minutes_____ 8
After 75 minutes_____ 3

After about 30 minutes heating the residue became a stiff porous gel which darkened as the depolymerization proceeded. After four hours, when distillation had practically ceased, only a small amount of brittle porous mass remained. The distillate obtained consisted of 32 g. of light yellow liquid and 8 g. of white solid. The solid portion on recrystallization from alcohol melted at 110° C. It was the cyclic dimer. Anal. of dimer: calcd. for $C_{20}H_{32}O_8$=C, 60.00%; H, 8.00%; mol. wt., 400. Found: C, 60.41%; H, 8.14%; mol. wt., 393.

The liquid portion of the distillate on redistillation gave 21 g. of pure cyclic monomer, boiling at 108–110° C. at 2 mm. pressure. Anal. of monomer: calcd. for $C_{10}H_{16}O_4=C,60.00\%$; $H,8.00\%$; mol. wt., 200. Found: $C,59.76\%$; $H,8.04\%$; mol. wt., 199.

The structures of these products are represented below:

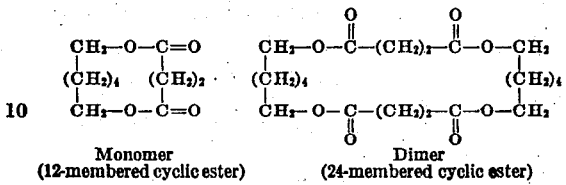

Monomer (12-membered cyclic ester)    Dimer (24-membered cyclic ester)

Other cyclic esters prepared by this general method are listed in Table I.

Example 2

Decamethylene carbonate polymer was prepared by heating 43.5 g. of decamethylene glycol with 43.5 g. of butyl carbonate in the presence of 0.5 g. of stannous chloride to 200° C. during about four hours. Forty-four grams of the polymer thus prepared was heated with 0.5 g. of stannous chloride at 268° C. under 1 mm. absolute pressure for four hours in a vapor heated still of the type shown in the figure. The distillate amounted to 25 g. from which 15 g. of highly pure decamethylene carbonate boiling at 92°–93° C. at 1 mm. was obtained on fractional distillation. The product

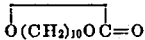

was identical with that described by Carothers and Hill in J. Am. Chem. Soc. 55, 5031 (1931).

Other linear carbonates yielded the corresponding cyclic esters when treated in a similar manner.

Example 3

A mixture of 20 g. of hexamethylene sebacate polymer and 0.2 g. of hydrated cobalt nitrate was heated for two hours at about 270° C. under 1 mm. absolute pressure in a glass still of the type illustrated in the figure. The distillate (14 g.) was dissolved in 50 cc. of alcohol, cooled in solid carbon dioxide, and filtered. The residue (11 g.) consisted of pure monomeric hexamethylene sebacate (18-membered cyclic ester), melting at 41° C. It has a musk-like odor. Anal. of monomer: Calcd. for $C_{16}H_{28}O_4=C,67.60\%$; $H,9.85\%$; mol. wt., 284. Found: $C,67.41\%$; $H,9.75\%$; mol. wt., 260.

A wide variety of catalysts may be used in the preparation of cyclic esters. The results obtained in depolymerizing hexamethylene sebacate with a number of these catalysts under conditions identical with those used in Example 3 with cobalt nitrate are listed in Table III.

TABLE III

Depolymerization catalysts

| Catalyst | Crude yield percent | Pure product percent |
|---|---|---|
| $SnCl_2 \cdot 2H_2O$ | 65 | 45 |
| $MnCl_2 \cdot 4H_2O$ | 75 | 55 |
| $FeCl_2 \cdot 4H_2O$ | 75 | 57 |
| $MgCl_2 \cdot 6H_2O$ | 75 | 57 |
| $CoCl_2 \cdot 6H_2O$ | 80 | 65 |
| $Co(NO_3)_2 \cdot 6H_2O$ | 70 | 55 |
| $MnCO_3$ | 60 | 40 |
| $MgO$ | 70 | 45 |
| $MgCO_3$ | 70 | 55 |
| Mg powder | 75 | 60 |
| No catalyst | 5 | 0 |

Example 4

A mixture of 20 g. of ω-hydroxydecanoic acid linear polymer, $(O-(CH_2)_9CO)_x$, and 0.5 g. of hydrated magnesium chloride was heated in a vapor heated still to 270° C. at one mm. or less absolute pressure for two hours. The distillate, a mixture of white solid and liquid, weighed 13 g. On recrystallization from 50 cc. of alcohol, 9 g. of dimer separated, melting at 95°–96° C. The alcohol residue was concentrated and distilled in vacuo. One and one-half grams of monomer was isolated boiling at 113°–115° C. at 15 mm. Other properties of the monomer are: melting point, 6° C.;

$N_D^{33}$ 1.4655; $D_4^{33}$ 0.9926.

Analysis: calcd. for $C_{10}H_{18}O_2=C,70.58$; $H,10.58$.

Found: $C,70.31$; $H,10.13$.

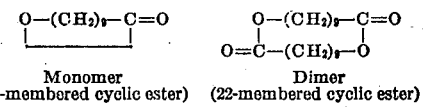

Monomer (11-membered cyclic ester)    Dimer (22-membered cyclic ester)

Example 5

Fifty-seven grams of the linear polyester obtained from ω-hydroxytetradecanoic acid was depolymerized by heating in a glass still with 0.6 g. of stannous chloride for 4.5 hours at 270° C. under one mm. absolute pressure. The distillate (depolymerizate) weighed 43 g. On fractional distillation under reduced pressure it gave approximately one g. of a cyclic dimer and 25 g. of highly pure monomer. The latter had a musk-like odor, melted at 28° C., boiled at 163–166° C. at 13 mm., and had a refractive index of $n_D^{34}$ 1.4674

These properties check closely with those reported in the literature for this compound. (Ruzicka and Stoll, Helv. Chim. Acta 11, 1171 (1928).

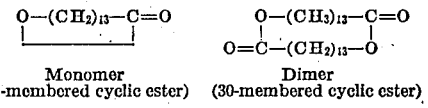

Monomer (15-membered cyclic ester)    Dimer (30-membered cyclic ester)

Other cyclic esters of the lactone type can be prepared in the same manner. Thus, the 16-membered pentadecanoic acid lactone can be prepared by this procedure from the polymer of ω-hydroxypentadecanoic acid.

Compounds which have proved of particular value as catalysts for the depolymerization of linear polyesters are listed in Table III. These may be used in the hydrated or anhydrous form either alone or in mixture. It may also be mentioned that powdered magnesium may be used. The process, while of particular value with those catalysts listed in Table III, is applicable generally to the chlorides, nitrates, carbonates and oxides of magnesium, manganese, iron, cobalt, and tin when these metals are in the divalent state. The following catalysts were tested and found ineffective in influencing the depolymerization: zinc fluoride, boron trifluoride, antimony trifluoride, zinc chloride, nickelous chloride, cuprous chloride, chromous chloride, chromic chloride, aluminum chloride, titanium tetrachloride, stannous bromide, antimony triiodide, calcium carbonate, ferrous sulfate, magnesium phosphate, potassium acetate, sodium tungstate, sodium vanadate, boric oxide, silicotungstic acid, and potassium phthalimide. Ferric chloride, antimony trichloride, thallium carbonate, and thorium nitrate had only a slight catalytic effect. A wide variety of glycols and dibasic acids are represented in the cyclic esters described in Table I. The invention is not limited to the preparation of these particular esters, however. Esters may be prepared from other acids, such as oxalic, methylmalonic, dimethylsuccinic, cyclohexanedicarboxylic, phenylenediacetic, resorcinoldiacetic, and hydroquinonediacetic acid. In addition to those mentioned in the examples and the tables, esters may be prepared from glycols such as $\beta,\beta$-dimethyltrimethylene glycol. The case of depolymerization varies with the esters. Decamethylene phthalate and decamethylene maleate are resistant to depolymerization, as are likewise those polyesters derived from 12-hydroxystearic acid and from hydroxycitronellic acid. In the case of depolymerization of hydroxy acids, those esters prepared from hydroxy acids having primary hydroxyl groups are preferred, and particularly the $\omega$-hydroxy acids.

This invention provides a rapid and efficient method for the preparation of cyclic esters having at least seven atoms. The catalysts are much more effective than those of the prior art, particularly in the preparation of cyclic esters from hydroxy acids and from glycols and dibasic acids higher than malonic. Furthermore, by the use of these catalysts a much higher ratio of monomer to dimer than that obtainable by the method of the above described application may be realized. Many of the compounds herein described have odors rendering them useful in the perfume art. Those containing 15, 16, and 17 members in the ring have a pronounced musk-like odor and for this reason are useful as substitutes for the active principle of musk and civet.

Example 6

Addition of 0.1 g. of 1% solution of ethylene brassylate, nonamethylene adipate, or hexamethylene azelate to 20 g. of the following perfumes resulted in products having a more pleasant odor than similar compositions containing no cyclic ester. The cyclic esters act as powerful fixatives in these compositions and in this respect resemble natural musk (muscone) or the lactone from angelica oil.

A. An ambre perfume comprising labdanum, bergamot, and rose.
B. A jasmin perfume comprising benzyl acetate, linalool, linalyl acetate, and hydroxycitronellal.
C. A rose perfume comprising geraniol, citronelallal and phenylethyl alcohol.

The above description and examples are intended to be illustrative only. Any modification of or variation therefrom which conforms to the spirit of the invention is intended to be included within the scope of the claims.

I claim:
1. In a process for the preparation of a cyclic ester by depolymerization of the corresponding linear polyester by heating the same under vacuum, the step which comprises heating the linear polyester of $\omega$-hydroxypentadecanoic acid at 270° C. in a pressure of 1 mm. for four and a half hours in contact with approximately 1% of stannous chloride.
2. In a process for the preparation of a cyclic ester by depolymerization of the corresponding linear polyester by heating the same under vacuum, the step which comprises heating the linear polyester of $\omega$-hydroxypentadecanoic acid in contact with stannous chloride.
3. In a process for the preparation of a cyclic ester by depolymerization of the corresponding linear polyester by heating the same under vacuum, the step which comprises heating a linear polyester of an $\omega$-hydroxy fatty acid said acid having a unit length of at least seven in contact with stannous chloride.
4. In a process for the preparation of a cyclic ester by depolymerization of the corresponding linear polyester by heating the same under vacuum, the step which comprises heating a linear polyester having structural units of a unit length of at least seven in contact with stannous chloride.
5. In a process for the preparation of a cyclic ester by depolymerization of the corresponding linear polyester by heating the same under vacuum, the step which comprises heating a linear polyester in contact with a catalyst taken from the class consisting of chlorides, nitrates, carbonates and oxides of magnesium, manganese, iron, cobalt, and tin, said elements being in the divalent state.
6. In a process for the preparation of a cyclic ester by depolymerization of the corresponding linear polyester by heating the same under vacuum, the step which comprises heating a linear polyester in contact with cobaltous chloride.
7. In a process for the preparation of a cyclic ester by depolymerization of the corresponding linear polyester by heating the same under vacuum, the step which comprises heating a linear polyester in contact with magnesium chloride.
8. In a process for the preparation of a cyclic ester by depolymerization of the corresponding linear polyester by heating the same under vacuum, the step which comprises heating a linear polyester of an $\omega$-hydroxy fatty acid said acid having a unit length of at least seven in contact with magnesium chloride.
9. In a process for the preparation of a cyclic ester by depolymerization of the corresponding linear polyester by heating the same under vacuum, the step which comprises heating the linear polyester of $\omega$-hydroxydecanoic acid in contact with magnesium chloride.

EDGAR W. SPANAGEL.